(12) United States Patent
Hong et al.

(10) Patent No.: US 9,096,718 B2
(45) Date of Patent: *Aug. 4, 2015

(54) METHOD FOR IMPROVING THERMAL STABILITY OF POLYPROPYLENE CARBONATE

(71) Applicant: SK Innovation Co., Ltd., Seoul (KR)

(72) Inventors: Seung Gweon Hong, Daejeon (KR); Jae Young Park, Daejeon (KR); HyeLim Kim, Busan (KR); KwangJin Chung, Daejeon (KR); MyungAhn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,878

(22) Filed: Sep. 8, 2014

(65) Prior Publication Data

US 2014/0378624 A1    Dec. 25, 2014

Related U.S. Application Data

(63) Continuation of application No. 13/324,634, filed on Dec. 13, 2011, now Pat. No. 8,841,387.

(30) Foreign Application Priority Data

Dec. 28, 2010 (KR) .......................... 10-2010-0136294

(51) Int. Cl.

| | |
|---|---|
| *C08G 64/42* | (2006.01) |
| *C08G 18/44* | (2006.01) |
| *C08G 64/00* | (2006.01) |
| *C08G 64/30* | (2006.01) |
| *C08L 75/04* | (2006.01) |
| *C08G 18/08* | (2006.01) |
| *C08G 18/71* | (2006.01) |
| *C08G 18/73* | (2006.01) |

(52) U.S. Cl.
CPC ............ *C08G 64/42* (2013.01); *C08G 18/0895* (2013.01); *C08G 18/44* (2013.01); *C08G 18/71* (2013.01); *C08G 18/73* (2013.01)

(58) Field of Classification Search
None
See application file for complete search history.

(56) References Cited

U.S. PATENT DOCUMENTS

| | | | | |
|---|---|---|---|---|
| 4,066,630 | A  * | 1/1978  | Dixon et al. ................... | 525/405 |
| 5,545,706 | A  * | 8/1996  | Barksby et al. ................. | 528/49 |
| 6,340,719 | B1 * | 1/2002  | Goeb et al. ..................... | 522/174 |
| 6,872,797 | B2 * | 3/2005  | Ueno et al. ...................... | 528/85 |
| 2007/0049719 | A1 | 3/2007 | Brauer et al. | |
| 2011/0230580 | A1 * | 9/2011 | Allen et al. .................... | 521/172 |
| 2012/0041086 | A1 * | 2/2012 | Sampath et al. ................ | 521/59 |
| 2013/0274401 | A1 * | 10/2013 | Allen et al. .................... | 524/445 |

FOREIGN PATENT DOCUMENTS

CN        1919891 A      2/2007

\* cited by examiner

*Primary Examiner* — James J Seidleck
*Assistant Examiner* — Peter A Salamon
(74) *Attorney, Agent, or Firm* — The Webb Law Firm

(57) ABSTRACT

Provided is a method for improving thermal stability of polypropylene carbonate and, more particularly, a method of end capping a molecular chain of polypropylene carbonate using a urethane group by adding isocyanates or diisocyanates to a polypropylene carbonate resin, which may optionally be a mixture containing tertiary polyol, so as to delay thermal degradation of the polypropylene carbonate at a high temperature, thereby securing desired thermal stability. Especially, the method capable of being easily applied to reactive extrusion after preparing the polypropylene carbonate has been proposed, thus simplifying production processes and ensuring economical advantages. Moreover, the above method does not deteriorate transparency and specific smoke density characteristics at combustion, which are advantages of the polypropylene carbonate.

5 Claims, No Drawings

METHOD FOR IMPROVING THERMAL STABILITY OF POLYPROPYLENE CARBONATE

CROSS-REFERENCE TO RELATED APPLICATIONS

This application is a continuation of U.S. patent application Ser. No. 13/324,634, filed Dec. 13, 2011, entitled "Method for Improving Thermal Stability of Polypropylene Carbonate", which claims priority under 35 U.S.C. §119 to Korean Patent Application No. 10-2010-0136294, filed Dec. 28, 2010, in the Korean Intellectual Property Office, the disclosures of which are incorporated herein by reference in their entirety.

TECHNICAL FIELD

The following disclosure relates to a method for improving thermal stability of polypropylene carbonate resin and, more particularly, to a method for improving thermal stability of polypropylene carbonate by introducing a urethane group through a reaction of isocyanate or diisocyanate with polyol to seal (or cap) the end of the polypropylene carbonate.

BACKGROUND

It has been known for a while that polypropylene carbonate produced in a manufacturing process using carbon dioxide as a raw material is considered important in terms of an eco-friendly resin. Contrary to a process using existing phosgene or dimethyl carbonate, the recent process uses carbon dioxide as a raw material, in turn highly contributing to a reduction in greenhouse gas, which causes global warming. Compared to other polycarbonates, polypropylene carbonate has propylene carbonate as a repeating unit of a molecule and such a repeating unit exhibits competitive tendencies of either generating a cyclic propylene carbonate mono-molecule, which is thermodynamically stable or growing into a polymer. Depending upon a catalyst, the repeating unit may become a cyclic propylene carbonate mono-molecule or, otherwise, grow into a polypropylene carbonate polymer. In the case where the polypropylene carbonate polymer is exposed to heat and receives active energy for thermal degradation, the polymer may begin to be degraded by thermodynamic equilibrium. A mechanism for thermal degradation of polypropylene carbonate may be generally classified into two types: scissoring, wherein any part in the middle of a molecular ring is broken, and back-biting, wherein a cyclic propylene carbonate is separated in a series from the end of molecule. According to studies in the related arts, it was reported that reacting a hydroxyl group at the end of polypropylene carbonate with an organic acid such as acetic acid anhydride or phthalic acid anhydride and sealing the same using an ester group may increase thermal stability. However, the above method must adopt esterification under a catalyst, after preparing the solution by dissolving polypropylene carbonate in a solvent. Therefore, in order to apply the foregoing method to commercial manufacturing, an additional reaction process and a drying process to remove a solvent are necessary, thus causing difficulties in ensuring desired low cost production.

SUMMARY

Therefore, an embodiment of the present invention is directed to providing a method for preparing a polypropylene carbonate resin with improved thermal stability, capable of increasing thermal stability while maintaining physico-chemical properties as well as molecular weight of polypropylene carbonate. According to an embodiment of the present invention, there is provided a method for preparing a polypropylene carbonate resin with improved thermal stability, which is applicable to reactive extrusion of polypropylene carbonate instead of a solution polymerization manner.

One embodiment of the present invention is to provide a method for preparing a polypropylene carbonate resin with improved thermal stability, which includes reaction of polyols including a polypropylene carbonate resin having a hydroxyl group on at least one end thereof with alkyl isocyanates or diisocyanates through reactive extrusion.

With regard to the preparation method according to a preferred embodiment of the present invention, alkyl isocyanate may be alkyl isocyanate having 14 or less carbon atoms or alkyl isocyanate containing an aromatic group in a molecule.

With regard to the preparation method according to a preferred embodiment of the present invention, alkyl isocyanate may be any one selected from benzyl isocyanate and naphthyl isocyanate alone or a mixture thereof.

With regard to the preparation method according to one embodiment of the present invention, polyols may be a mixture including 100 parts by weight of a polypropylene carbonate resin and 2 to 25 parts by weight of tertiary polyols.

With regard to the preparation method according to a preferred embodiment of the present invention, after adding 2 to 25 parts by weight of tertiary polyols to 100 parts by weight of a polypropylene carbonate resin, the mixture may undergo reactive extrusion, using diisocyanates in an amount corresponding to an equivalent of both the foregoing resins.

With regard to the preparation method according to the above embodiment, the tertiary polyol may have a molecular weight of 300 to 3000 g/mole, and be a polyesterdiol obtained by copolymerization of at least one selected from adipic acid, glutaric acid and succinic acid with ethyleneglycol.

With regard to a preparation method according to another embodiment of the present invention, the tertiary polyol may have a molecular weight of 300 to 3000 g/mole, and be polycarbonate diol prepared from at least one selected from 1,3-propanediol, 1,2-propanediol, ethyleneglycol, 1,4-butanediol, 1,5-pentanediol and 1,6-hexanediol.

With regard to the preparation method according to one embodiment of the present invention, diisocyanates may be any one selected from hexamethylene diisocyanate, hexamethylene diisocyanate trimer, isophorone diisocyanate, toluene diisocyanate, methylenediphenyl diisocyanate, xylene diisocyanate and polyisocyanate having three functional groups, alone or a mixture of two or more thereof.

With regard to the preparation method according to one embodiment of the present invention, diisocyanates may be reacted to have an equivalent identical to or less than a sum of the hydroxyl value of polypropylene carbonate as well as the hydroxyl value of tertiary polyol.

The method for preparing a polypropylene carbonate resin according to one embodiment of the present invention may exhibit effects of improving thermal stability and maintaining transparency of the resin by end-capping chains of polypropylene carbonate resin molecules, without damaging inherent properties of polypropylene carbonate. In addition, the inventive preparation method may adopt reactive extrusion, without requiring other polymerization processes such as solution polymerization or the like. Further, regardless of the presence of a catalyst during reactive extrusion, since an isocyanate group can completely react with a hydroxyl group of polypropylene carbonate, the prepared polymer may directly be applied to a pelletizing extruder without requiring any additional processes, thus enhancing low cost production efficiency.

Other features and aspects will be apparent from the following detailed description, the drawings, and the claims.

DETAILED DESCRIPTION OF EMBODIMENTS

The present invention will be more apparent from the following detailed description.

The present invention may provide a method of easily capping ends (of polypropylene carbonate) by reacting highly reactive isocyanate with a hydroxyl group contained in at least one end of polypropylene carbonate.

In general, polypropylene carbonate diol having a molecular weight of 3,000 g/mole or less may be used to prepare polypropylene carbonate diol urethane by reacting hydroxyl groups at both ends of a molecular chain of the diol with diisocyanate. In the case where the molecular weight of the polypropylene carbonate diol is not less than 10,000 or, otherwise, the polypropylene carbonate diol is prepared by anionic polymerization between propylene oxide and carbon dioxide to have a hydroxyl group only at one end of a molecular chain thereof, it is difficult to prepare polyurethane according to the foregoing method. Moreover, urethane reaction of polypropylene carbonate entails difficulties in maintaining transparency of polypropylene carbonate.

Considering such viewpoints, one embodiment of the present invention proposes reaction of a hydroxyl group on at least one end of polypropylene carbonate with monoisocyanate such as benzyl isocyanate, naphthyl isocyanate, etc. or diisocyanate, to cap ends of a molecular chain of polypropylene carbonate, thus improving thermal stability. Optionally, a method further including addition of polyester diol or polycarbonate diol, which is highly compatible with polypropylene carbonate, to the reaction, may be provided in order to improve thermal stability.

More particularly, according to one embodiment of the present invention, there is provided a method for preparing a polypropylene carbonate resin with improved thermal stability by reacting a polypropylene carbonate resin having a hydroxyl group on at least one end thereof with alkyl isocyanate through reactive extrusion.

Generally, reaction of a mono-molecular alkyl isocyanate does not deteriorate transparency of polypropylene carbonate. Specifically, alkyl isocyanate which contains an aromatic ring in a molecular structure thereof or of which an alkyl group has a carbon length of not more than 14 carbon atoms, may be suitable for the foregoing purposes. The reason for this is to allow the introduced alkyl group to exhibit compatibility with polypropylene carbonate.

As a practical example, alkyl isocyanate may be any one selected from benzyl isocyanate and naphthyl isocyanate alone or a mixture thereof.

According to another embodiment of the present invention, there is provided a method of introducing a polyurethane polymer chain having a shorter length by reacting a polypropylene carbonate resin with diisocyanate and adding a constant content of tertiary polyol thereto.

Introduction of a urethane group to an end of polypropylene carbonate by adding tertiary polyol may enable determining transparency along with types of tertiary polyols, compared to the capping process using a mono-molecular alkyl isocyanate described above.

In the case where tertiary polyol is introduced and reacts with diisocyanate such as hexamethylene diol-diisocyanate, compatibility may be varied depending upon types of polyols attached to the end of polypropylene carbonate, in turn causing problems in securing the transparency of the polypropylene carbonate. In light of such aspects, the tertiary polyol may have a molecular weight of 300 to 3000 g/mole, and be polyesterdiol obtained by copolymerization of at least one selected from adipic acid, glutaric acid and succinic acid with ethylene glycol. Alternatively, the tertiary polyol may have a molecular weight of 300 to 3000 g/mole, and be polycarbonate diol prepared of at least one selected from 1,3-propanediol, 1,2-propanediol, ethylene glycol, 1,4-butanediol, 1,5-pentanediol and 1,6-hexanediol.

In the case where such tertiary polyol is used as a mixture with diisocyanate, the mixture may advantageously influence improvement of thermal stability of the polypropylene carbonate resin along with an added amount thereof. However, when the added amount is increased, transparency may be deteriorated. In the light of such aspect, the tertiary polyol is preferably contained in an amount of not more than 25 parts by weight, more preferably, 2 to 25 parts by weight to 100 parts by weight of diisocyanate.

Such diisocyanates may include, for example, any one selected from hexamethylene diisocyanate, hexamethylene diisocyanate trimer, isophorone diisocyanate, toluene diisocyanate, methylenediphenyl diisocyanate, xylene diisocyanate and polyisocyanate having three functional groups, alone or a mixture of two or more thereof.

Reacting the diisocyanate in the same equivalent as the sum of the hydroxyl value of polypropylene carbonate and the hydroxyl value of polyol may exclude the residue of isocyanate, which in turn advantageously prevents white suspension from being generated by reaction of the isocyanate residue with moisture when exposed to the moisture in air after reactive extrusion and eliminates stimulation of the completely treated polymer to skin.

The term "reactive extrusion" described above and below may mean extrusion involving a reaction of polyol with isocyanate to generate urethane.

Conditions for the reactive extrusion are not particularly restricted so long as they are within the foregoing definition, however, may satisfy an extrusion speed to reach a retention time of a composition ranging from 20 to 40 minutes at an extrusion temperature (reaction temperature) of 160 to 180° C., preferably, an extrusion speed to reach a retention time of a composition ranging from 20 to 30 minutes. If the reaction temperature exceeds 180° C., fluidity of a polymer increases, in turn causing difficulties in pelletization through extrusion. On the other hand, when the reaction temperature is less than 160° C., a time required for reaction is increased, in turn considerably reducing the extrusion speed.

With regard to the end capping method of a molecular chain of polypropylene carbonate according to one embodiment of the present invention, a method of initially reacting polypropylene carbonate with isocyanate or diisocyanate in an extruder and optionally adding tertiary polyol to the reaction, to prepare polypropylene carbonate with transparency and high thermal stability, instead of solution reaction, may be proposed.

According to the present invention, the polypropylene carbonate having hydroxyl groups at both ends thereof or the polypropylene carbonate having a hydroxyl group at only one end thereof may have improved thermal stability using a variety of isocyanates and, further, exhibit advantages since end capping of molecular chains of the foregoing polypropylene carbonate may be conducted using fusion extrusion instead of solution reaction.

Since a polymer is reacted in an extruder while fusing the polymer, inconvenience in removing a solution may be eliminated after completing the reaction.

Hereinafter, the present invention will be described in detail according to the following examples. However, such examples are proposed for illustrative purposes and the scope of the present invention is not restricted thereto.

Example 1

After reacting polypropylene carbonate having a weight mean molecular weight of 200,000 g/mol with acetic acid anhydride, acetic acid free therefrom was titrated using a sodium hydroxide solution, to determine a hydroxyl value of the polypropylene carbonate. Benzyl isocyanate in about 1.0 equivalent of the hydroxyl value determined above, was added to the titrated amount of the polypropylene carbonate. After sufficiently shaking the mixture, the mixture was introduced into a twin extruder followed by extrusion at 160° C. Here, an extrusion speed was controlled to reach a retention time of the polypropylene carbonate mixture of 20 minutes in the extruder.

As a result of observation using an infrared-ray spectrometer by taking a part of the polypropylene carbonate having end capped molecular chains resulting from the extrusion, it was found that isocyanate absorption peaks present near 2270 $cm^{-1}$ have disappeared.

By taking a part of the end-capped polypropylene carbonate obtained after completely exhausting isocyanate, TAG analysis was executed in air at an elevated temperature to determine a 50% decomposition temperature. Then, mass loss at 180° C. for 1 hour was compared to determined thermal degradation stability. The above experimental results are summarized in the following Table 1.

Example 2

In Example 1, after adding 10 parts by weight of polycarbonate diol having a weight mean molecular weight of 2000 g/mole (G Asahi Casei), as a tertiary polyol, to 100 parts by weight of the polypropylene carbonate having a weight mean molecular weight of 200,000 g/mol and sufficiently mixing the same, hexamethylene diisocyanate (HDI) in an amount corresponding to the equivalent of hydroxyl groups in the added tertiary polyol as well as polypropylene carbonate was further added thereto, followed by extrusion under the same conditions. The extruded sample was taken and subjected to analysis of degree of reaction according to the same procedure as described in Example 1 and compared thermal stability.

Example 3

The same procedure as described in Example 2 was implemented to prepare an extruded sample, except that HDI trimer was used instead of the HDI used in Example 2. The extruded sample was taken and subjected to analysis of degree of reaction according to the same procedure as described in Example 1 and compared thermal stability.

Example 4

The same procedure as described in Example 2 was implemented to prepare an extruded sample, except that dibutyltin dilaurate (DBTDL) as a catalyst was further added in a molar ratio of 0.1 to the tertiary polyol. The extruded sample was taken and subjected to analysis of degree of reaction according to the same procedure as described in Example 1 and compared thermal stability.

Example 5

The same procedure as described in Example 2 was implemented to prepare an extruded sample, except that the reaction temperature was decreased to 140° C. and the retention time in the extruder was set to 30 minutes. The extruded sample was taken and subjected to analysis of degree of reaction according to the same procedure as described in Example 1 and compared thermal stability.

Example 6

The same procedure as described in Example 2 was implemented to prepare an extruded sample, except that 25 parts by weight of polycarbonate diol having a molecular weight of 2000 g/mole was added to 100 parts by weight of a polypropylene carbonate resin. The extruded sample was taken and subjected to analysis of degree of reaction according to the same procedure as described in Example 1 and compared thermal stability.

Example 7

The same procedure as described in Example 2 was implemented to prepare an extruded sample, except that 10 parts by weight of polyester diol having a molecular weight of 2000 g/mole (UNI 3012, a product manufactured by Union Chemical Industry) was used, instead of the polycarbonate diol having a molecular weight of 2000 g/mole. The extruded sample was taken and subjected to analysis of degree of reaction according to the same procedure as described in Example 1 and compared thermal stability Comparative Example 1

A polypropylene carbonate resin having a weight mean molecular weight of 200,000 g/mol was dissolved in dichloromethane to reach 20% and placed in 1 L flask. Then, acetic acid anhydride was added in 2-fold amount a hydroxyl group equivalent of the polypropylene carbonate to the flask under stirring, followed by reaction for 20 minutes while refluxing. After reaction, an aliquot of the solution was taken and subjected to acidity measurement to identify that the acetic acid anhydride has reacted with hydroxyl groups in the polypropylene carbonate. The foregoing polymer solution underwent polymer precipitation by adding excess methanol thereto, and the precipitated polymer was separated from a solvent portion to form a polypropylene carbonate having ends capped with acetic acid ester. The end capped polypropylene carbonate was subjected to comparison of thermal stability according to the same procedure as described in Example 1.

Comparative Example 2

An extruded sample was obtained from the polypropylene carbonate resin having a weight mean molecular weight of 200,000 g/mol without benzyl isocyanate treatment, i.e. reactive extrusion without benzyl isocyanate and subjected to comparison of thermal stability according to the same procedure as described in Example 1.

Referential Example 1

30 parts by weight of the tertiary polyol was used to prepare a sample according to the same procedure as described in Example 2, and thermal stability of the sample was compared.

TABLE 1

| | Molecular weight after reaction (g/mole) | Residue of isocyanate (wt. %) | Haze (%) | 50% degradation temperature (° C.) | Mass loss for 1 hour at 180° C. (%) |
|---|---|---|---|---|---|
| Example 1 | 200,000 | <0.1 | 5.0 | 280 | 0.5 |
| Example 2 | 202,000 | <0.1 | 5.2 | 285 | 0.4 |
| Example 3 | 201,000 | <0.1 | 5.6 | 290 | 0.2 |
| Example 4 | 203,000 | <0.1 | 5.7 | 288 | 0.1 |
| Example 5 | 203,000 | <0.1 | 5.1 | 283 | 0.1 |
| Example 6 | 203,000 | <0.1 | 5.8 | 284 | 0.1 |
| Example 7 | 202,000 | <0.1 | 5.5 | 289 | 0.1 |
| Comparative Example 1 | 200,000 | — | 5.4 | 271 | 3.1 |
| Comparative Example 2 | 200,000 | — | 5.6 | 258 | 7.3 |
| Referential Example 1 | 203,000 | <0.1 | 16.4 | 293 | 0.1 |

From results shown in Table 1, it can be seen that the polypropylene carbonate with improved thermal stability according to the present invention exhibits elevation of thermal degradation temperature by TGA and enhanced thermal stability at a high temperature of 180° C. For the polypropylene carbonate without benzyl isocyanate treatment, i.e. reactive extrusion without benzyl isocyanate. (Comparative Example 2), it was found that the mass loss due to thermal degradation was considerably high such as 7.3% when it was left at a high temperature for 1 hour. Also, in the case where the end was capped with acetic acid anhydride (Comparative Example 1), thermal stability was improved, however, the extent of improvement in thermal stability was considerably lower than the case where end capping was executed using alkyl isocyanate of the present invention or by adding diisocyanate as well as tertiary polyol to bind a short length of urethane chain to one end of polypropylene carbonate, thus achieving end capping. In this regard, the process of capping the end of the polypropylene carbonate using an organic acid such as acetic acid anhydride entails problems in implementing a reaction in a solution and, then, separating the reaction product to recover a polymer. On the contrary, the present inventive method may adopt reactive extrusion and, regardless of the presence of catalyst during extrusion, enable complete reaction of isocyanate groups with hydroxyl groups of the polypropylene carbonate, thereby not requiring any additional processes but directly applying the produced polymer to an extruder for pelletizing. Therefore, high economical efficiency may be attained.

Meanwhile, referring to Referential Example 1 to identify transparency depending upon tertiary polyol content, it is confirmed that, if 25 parts by weight or more of polyol is added to 100 parts by weight of polypropylene carbonate, transparency is deteriorated although thermal stability is improved.

As is apparent from the foregoing, preferred embodiments of the present invention have been described in detail. However, it will be apparent to those skilled in the art that modifications and variations can be made without departing from the spirit and scope of the invention as defined by the appended claims. Therefore, the present invention is not particularly limited to the foregoing embodiments.

What is claimed is:

1. A method for preparing a polypropylene carbonate resin with improved thermal stability, comprising: reacting a polypropylene carbonate resin having a hydroxyl group on at least one end thereof with alkyl monoisocyanates or through reactive extrusion.

2. The method of claim 1, wherein the alkyl monoisocyanate is alkyl monoisocyanate having 14 or less carbon atoms or alkyl monoisocyanate containing an aromatic group in a molecule.

3. The method of claim 2, wherein the alkyl monoisocyanate is any one selected from benzyl monoisocyanate and naphthyl monoisocyanate alone or a mixture thereof.

4. The method of claim 1, wherein the alkyl monoisocyanate in an amount corresponding to the equivalent of hydroxyl groups in the polypropylene carbonate resin is reacted through the reactive extrusion.

5. The method of claim 1, wherein the reactive extrusion is carried out at an extrusion temperature of 160 to 180° C.

* * * * *